United States Patent [19]

Dymond

[11] 4,276,812

[45] Jul. 7, 1981

[54] POWER STEERING VALVE AND METHOD OF MAKING THE SAME

[75] Inventor: Richard W. Dymond, Rochester, Mich.

[73] Assignee: TRW Inc., Cleveland, Ohio

[21] Appl. No.: 890,032

[22] Filed: Mar. 27, 1978

[51] Int. Cl.³ .............................................. F15B 13/04
[52] U.S. Cl. .................................. 91/467; 137/625.23; 137/625.24
[58] Field of Search .................... 91/467, 375 A, 375; 137/625.24, 625.23; 180/132; 251/366

[56] References Cited

U.S. PATENT DOCUMENTS

| 3,022,772 | 2/1962 | Zeigler et al. | 91/375 A |
|---|---|---|---|
| 3,433,127 | 3/1969 | Thompson | 91/375 A |
| 3,591,139 | 7/1971 | Bishop | 251/367 |
| 3,602,255 | 8/1971 | Bishop | 137/625.24 |
| 3,667,346 | 6/1972 | Duffy | 91/375 A |
| 3,896,702 | 7/1975 | Shah et al. | 91/375 A |
| 3,908,479 | 9/1975 | MacDuff | 91/375 A |
| 3,921,669 | 11/1975 | Goff | 137/625.24 |
| 4,117,864 | 10/1978 | Taig | 137/625.23 |
| 4,164,892 | 8/1979 | Goff et al. | 91/375 A |
| 4,194,531 | 3/1980 | Bishop | 137/625.24 |

FOREIGN PATENT DOCUMENTS 959495   6/1964 United Kingdom .
960841   6/1964 United Kingdom .
1149931  4/1969 United Kingdom .
1153090  5/1969 United Kingdom .
1194520  6/1970 United Kingdom .
1427705  3/1976 United Kingdom .

Primary Examiner—Irwin C. Cohen
Attorney, Agent, or Firm—Yount & Tarolli

[57] ABSTRACT

An improved power steering valve has a sleeve which circumscribes an inner valve member. An end mill or other rotary cutting tool is utilized to form axially extending grooves inside the valve sleeve. When the end mill is forming the grooves inside the valve sleeve, the axis of rotation of the end mill extends at an acute angle relative to the central axis of the valve sleeve. This results in a groove being formed with axially sloping end surfaces. In order to tend to maximize the compactness of the construction of the valve sleeve, fluid passages or holes are drilled along a sloping path from annular grooves on the outside of the valve sleeve to the sloping end surfaces of the axial grooves inside the valve sleeve. In addition, the compact construction of the valve sleeve is further promoted by forming some of the annular grooves with sloping bottom surfaces so that these grooves are relatively deep. This enables the width of these grooves to be reduced without reducing the capacity of these grooves to accommodate fluid flow.

8 Claims, 12 Drawing Figures

POWER STEERING VALVE AND METHOD OF MAKING THE SAME

BACKGROUND OF THE INVENTION

This invention relates to a new and improved power steering valve and more specifically to a valve sleeve having internal grooves which are formed with a rotating cutting tool, such as an end mill.

Many known power steering arrangements have valves to control the flow of fluid to a hydraulic motor. These valves may include an inner valve member which is rotated relative to a valve sleeve against the influence of a biasing spring. Relative rotation between the inner valve member and the valve sleeve directs a flow of fluid to the power steering motor to effect turning movement of the vehicle wheels in a known manner. Various known power steering systems having valves which operate in this manner are disclosed in U.S. Pat. Nos. 3,022,772; 3,667,346; 3,896,702; and 3,921,669.

Difficulty has been encountered in forming axially extending grooves on the inside of the valve sleeve. This difficulty results from the fact that the inside of the hollow cylindrical valve sleeve is relatively inaccessible. In order to form the axially extending grooves on the inside of the valve sleeve, it has been suggested that both a cutting tool and the valve sleeve be oscillated relative to each other through a plurality of strokes in order to enable the cutting tool to gradually form a slot or groove in the valve sleeve in the manner disclosed in U.S. Pat. No. 3,591,139. However, it is believed that this method of forming the valve sleeve is less than completely satisfactory since the method is relatively slow and requires a relatively complicated arrangement to oscillate both the valve sleeve and the cutting tool. It has also been suggested that electrochemical machining processes or spark erosion processes could be utilized to form the grooves inside the valve sleeve in the manner disclosed in British Pat. No. 1,427,705. However, these processes are not entirely suitable for producing the precise fluid control surfaces required in control valves of this type.

SUMMARY OF THE PRESENT INVENTION

The present invention relates to a new and improved valve sleeve and method by which the valve sleeve is formed. The hollow cylindrical valve sleeve has a plurality of axially extending internal grooves which are formed with a rotating cutting tool such as an end mill. While the end mill is being rotated about an axis which extends at an acute angle to the longitudinal central axis of the valve sleeve, a leading end portion of the cutting tool engages the valve sleeve at a location which is spaced inwardly from an axial end portion of the valve sleeve. This results in the formation of one end portion of the axially extending groove within the valve sleeve. The rotating cutting tool and valve sleeve are then moved relative to each other until the leading end of the cutting tool is disposed at a location which is adjacent to and spaced apart from the opposite axial end of the valve sleeve. The tool and valve sleeve are then separated. Thereafter, the valve is indexed and additional grooves are formed in the same manner.

Each of the grooves has a sloping end surface. The sloping end surfaces of the grooves are connected with annular grooves in the outside of the valve sleeve by passages which extend at an acute angle to the longitudinal central axis of the valve sleeve. Since the passages extend at an acute angle relative to the central axis of the valve sleeve and since the passages interconnect the sloping end surfaces of the axially extending internal grooves with the annular external grooves, the length of the internal grooves is minimized so that the valve sleeve can have a relatively compact construction. The compact construction of the valve sleeve is further promoted by having at least some of the annular external grooves shaped so as to have a depth which takes advantage of the sloping end surfaces of the internal grooves. This enables the width of these annular external grooves to be minimized.

During the formation of the grooves on the inside of the valve sleeve, metal is cut away by either a leading end face or a side portion of the rotating cutting tool. By utilizing a rotating cutting tool to form the axially extending grooves in the valve sleeve, the width of the grooves can be accurately controlled. This is because the rotating cutting tool has a selected diameter which determines the maximum width of the groove.

Accordingly, it is an object of this invention to provide a new and improved valve sleeve having axially extending internal grooves which are formed by a new and improved method which includes the use of a rotating cutting tool to form the grooves.

Another object of this invention is to provide a new and improved method of forming a valve sleeve and wherein axially extending grooves having closed end portions are formed inside the valve sleeve by moving a rotating cutting tool and valve sleeve relative to each other.

Another object of this invention is to provide a new and improved power steering apparatus having a control valve sleeve with annular external grooves of different depths to minimize the axial extent of the valve sleeve by taking advantage of sloping end surfaces on axially extending grooves formed on the inside of the valve sleeve to maximize the depth of the annular external grooves.

Another object of this invention is to provide a new and improved power steering apparatus having external grooves which are connected with axially extending internal grooves by passages which intersect sloping end surfaces of the internal grooves.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Power Steering Apparatus

Figure 1:
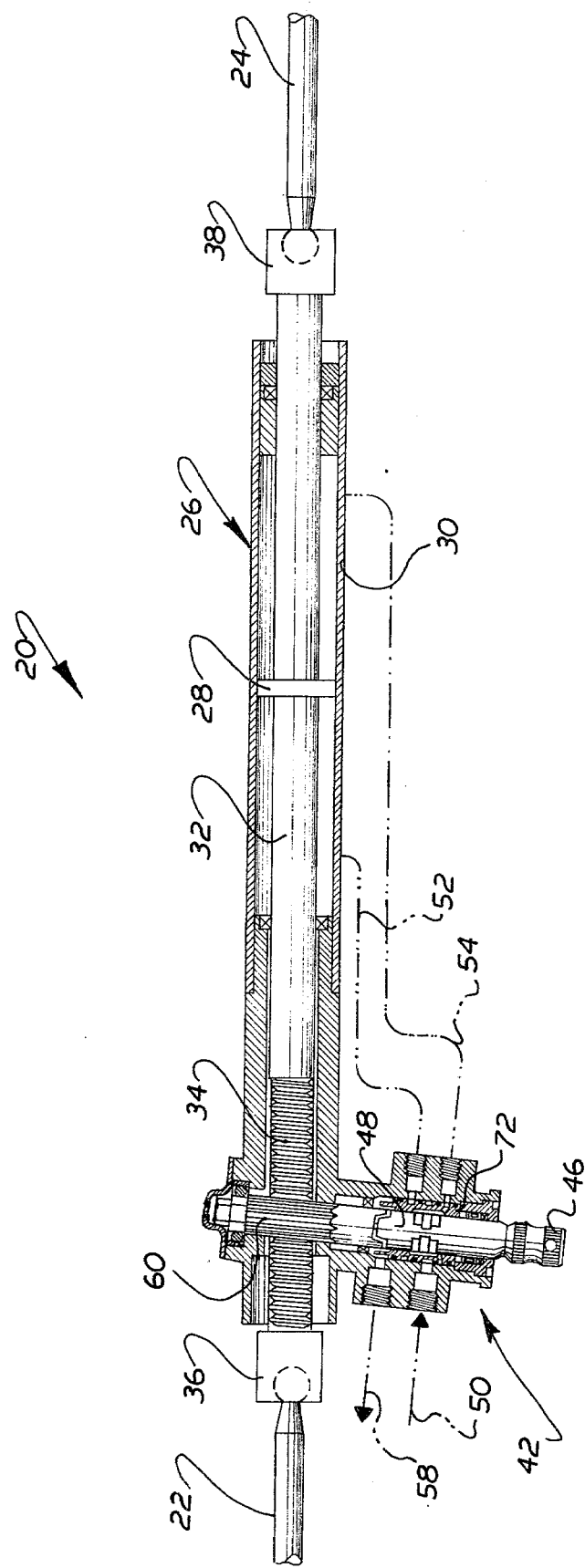
FIG. 1 is a sectional view of a rack and pinion power steering apparatus having a control valve assembly constructed in accordance with the present invention.

A power steering apparatus 20 (see FIG. 1) is connected with a pair of steerable vehicle wheels in a known manner by tie rods 22 and 24. The power steering apparatus 20 includes a power steering motor 26 having a circular piston 28 disposed in a motor cylinder 30. The circular piston 28 is fixedly connected with a generally cylindrical rack bar 32 upon which a longitudinally extending array of rack gear teeth 34 are disposed. Opposite ends of the rack bar 32 are connected with the tie rods 22 and 24 by ball joints 36 and 38.

A valve assembly 42 is provided to control the operation of the power steering motor 26. The valve assembly 42 includes an input section 46 which is connected with a rotatable vehicle steering wheel (not shown) and is integrally formed with an inner valve member 48. Upon rotation of the input section 46, the valve assembly 42 directs fluid under pressure from a conduit 50 to either a conduit 52 or 54 connected with the power steering motor 26. The other one of the two conduits 52 or 54 is exhausted to a drain or fluid return conduit 58 through the valve assembly 42. The relatively high fluid pressure conducted to the power steering motor 26 results in movement of the piston 28 and the rack gear 34 to effect turning movement of the vehicle wheels and rotation of a pinion gear 60.

The pinion gear 60 cooperates with the valve assembly 42 to return it to an unactuated condition when the steerable vehicle wheels have been turned to an extent corresponding to the extent of rotation of the input section 46. It should be noted that although the rack bar 32 is primarily moved on the influence of forces supplied by the power steering motor 26, drive forces can also be transmitted directly to the rack bar by the pinion gear 60 in a known manner. Since the general construction and mode of operation of the power steering apparatus 20 is well known, it will not be further described herein to avoid prolixity of description.

Valve Assembly

The valve assembly 42 (FIG. 2) includes the generally cylindrical inner valve member 48 which is integrally formed with the input section 46. A torsion spring or rod 66 connects the inner valve member 48 with the pinion gear 60 in such a manner as to enable the inner valve member 48 to rotate through a limited distance before the pinion gear 60 is rotated. This limited rotation of the valve member 48 is effective to move the valve member relative to a housing 70 and valve sleeve 72 from the unactuated condition shown in FIG. 3 to the actuated condition shown in FIG. 4. Actuation of the valve assembly is effective to direct fluid pressure from a housing inlet passage 76. (FIG. 2) connected with the conduit 50 to a housing passage 77 connected in fluid communication with the motor conduit 54. At the same time, the motor conduit 52 is connected with drain conduit 58 through housing passages 82 and 84. This results in the power steering motor being operated to turn the steerable wheels.

Figure 3:
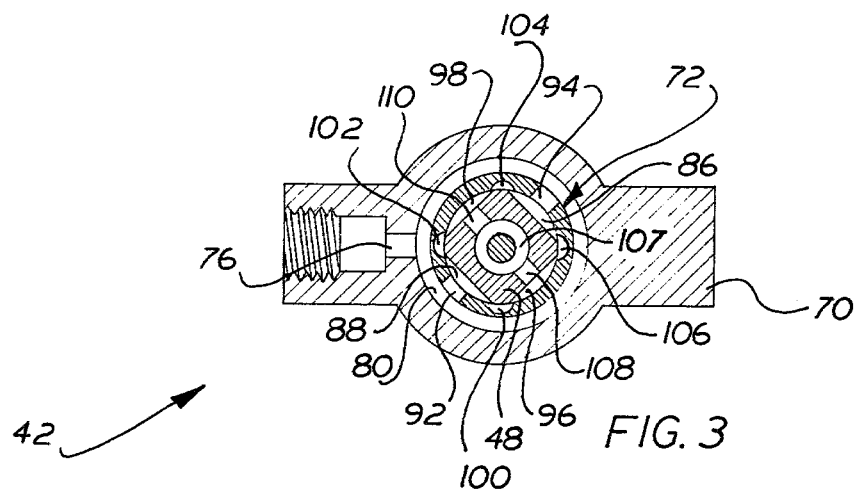
FIG. 3 is a sectional view, taken generally along the line 3—3 of FIG. 2, illustrating the relationship between an inner valve member and a valve sleeve when the valve assembly is an unactuated or neutral condition.

When the valve assembly 42 is in the unactuated condition of FIG. 3, fluid from conduit 50 is conducted through the housing passage 76 to an annular groove 80 formed by a pair of annular leads on the one-piece valve sleeve 72. The annular groove 80 is connected with pair of longitudinally extending pressure chambers 86 and 88 (see FIG. 3) disposed between the inner valve member 48 and the valve sleeve 72 by a pair of radially extending passages 92 and 94 (FIG. 3).

When the valve assembly 42 is in the unactuated condition of FIG. 3, the fluid in the chambers 86 and 88 flows to a pair of longitudinally extending outlet chambers 96 and 98 through a plurality of parallel axially extending grooves 100, 102, 104, and 106 formed in the valve sleeve 72. The grooves 100, 102, 104, and 106 all have arcuate bottom surfaces which promote a laminar flow of fluid through the grooves in a sidewise direction. The laminar fluid flow tends to reduce valve noise.

The outlet chambers 96 and 98 are connected with a longitudinally extending outlet passage 107 formed in the valve member 48 by a pair of passages 108 and 110 (FIG. 3). The fluid from the outlet passage 107 is directed to an axially inner end portion of the valve sleeve 72. The axially inner end portion of sleeve 72 is connected in fluid communication with the housing port 84 (see FIG. 2) leading to the exhaust conduit 58. Therefore, when the valve assembly 42 is in the neutral or unactuated condition, the fluid from conduit 50 merely flows through the valve assembly 42 and is returned to reservoir or pump inlet in a known manner.

Figure 4:
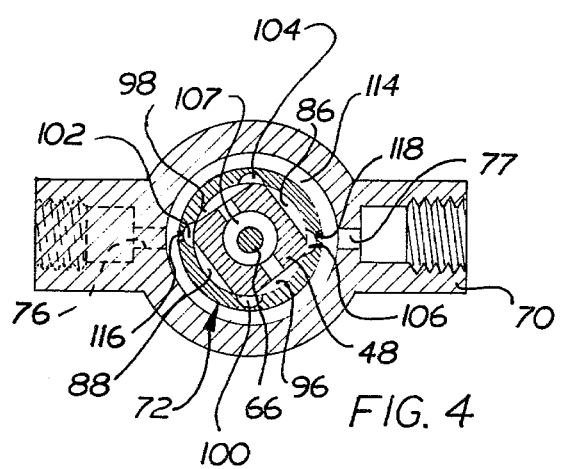
FIG. 4 is a sectional view, taken generally along the line 4—4 of FIG. 2, illustrating the relationship between the inner valve member and valve sleeve when the valve assembly is in an actuated condition.

Upon actuation of the valve assembly 42 to the condition shown in FIG. 4 to effect a turn, the inner valve member 48 restricts fluid flow from the pressure chambers 86 and 88 to the axially extending grooves 100 and 104. At the same time, the inner valve member increases the fluid communication between the grooves 100 and 104 and the relatively low pressure fluid outlet chambers 96 and 98.

While the fluid flow to the grooves 100 and 104 from the power steering pump is being decreased, fluid flow to the axially extending grooves 102 and 106 is being increased. The axially extending passages 102 and 106 are connected with an axially outer annular groove 114 formed on the valve sleeve 72 by a pair of passages 116 and 118 (see FIGS. 2 and 4). The annular groove 114 is connected in fluid communication with the motor conduit 54 through the housing passage 77.

The axially extending grooves 100 and 104 are connected with an annular groove 122 (FIG. 2) by passages extending from the axially extending grooves 100 and 104 in much the same manner as in which the passages 116 and 118 extend from the grooves 102 and 106. This enables the low pressure fluid exhausted from the power steering motor 26 to be conducted back to drain.

During a left turn, the inner valve member 48 is rotated in the opposite direction relative to the valve sleeve 72. Therefore the axially extending passages 100 and 104 are connected with the pressure chambers 86 and 88 and relatively high pressure inlet fluid is conducted to the annular groove 122. The groove 122 is connected in fluid communication with the motor conduit 52. At this time, the motor conduit 54 is exhausted to the drain conduit 58 through the annular groove 114, axial grooves 102 and 106 and outlet chambers 96 and 98.

One Method Of Forming The Valve Sleeve

Figure 5:
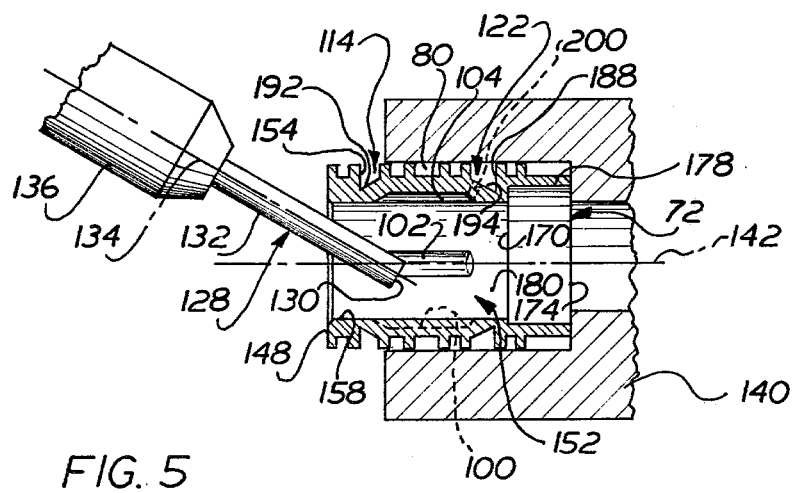
FIG. 5 is a fragmentary sectional view illustrating the relationship between the valve sleeve and a rotating cutting tool immediately before the cutting tool engages the valve sleeve.

In accordance with a feature of the present invention, the parallel axially extending grooves 100, 102, 104, and 106 are formed with a rotating cutting tool, that is an end mill 128 (see FIG. 5). The end mill 128 has a circular end face 130 and a cylindrical side portion 132. The end mill 128 is rotated about its longitudinally extending central axis 134 by a suitable drive member or chuck 136. Although many different types of end mills could be utilized, one suitable end mill is of the center cutting type manufactured by Greenfield Tap & Die of Greenfield, Mass. This particular end mill has cutting flutes at the circular end face 30 and cutting flutes extending along the side portion 132 so that material can be cut away with either the end face 130 or the side portion 132 of the end mill.

When the axially extending grooves 100, 102, 104, and 106 are to be formed in the metal valve sleeve 72, the valve sleeve is firmly mounted in an indexible holder or chuck 140 with a central axis 142 of the valve sleeve coincident with the axis of rotation of the chuck 140. The chuck 140 is accurately indexible to four position spaced 90° apart with each of the positions corresponding to a location in which one of the axially extending grooves is formed. It should be noted that in FIG. 5 the axially extending grooves 102 and 104 have been shown as already being cut away on the inside of the valve sleeve 72 while the axially extending groove 100 (indicated in dashed lines) has yet to be cut.

Figure 6:
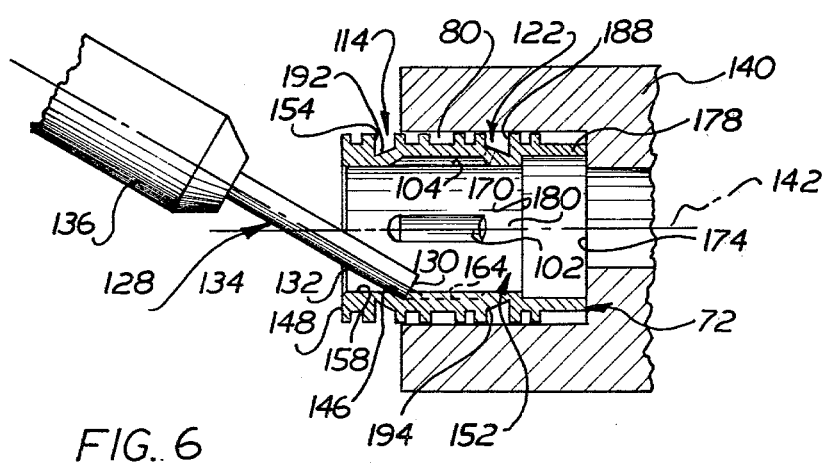
FIG. 6 is a fragmentary sectional view, generally similar to FIG. 5, illustrating the manner in which a leading end portion of the rotating cutting tool initially engages the valve sleeve during the formation of an axially extending groove.

In order to cut the axially extending groove 100, the end mill 128 and chuck 136 are moved downwardly from the position shown in FIG. 5 to the position shown in FIG. 6 along a path which extends perpendicular to the central axis 142 of the valve sleeve 72. This moves the circular end face 130 and side portion 132 at the leading end of the rotating end mill 128 into cutting engagement with the inside of the one-piece valve sleeve 72.

As the end mill 128 moves from the position shown in FIG. 5 to the position shown in FIG. 6, it forms a sloping end surface 146 of the groove 100 at a location axially inwardly of a circular axial end face 148 on the sleeve 72. It should be noted that the longitudinal central axis 134 of the end mill 128 intersects and extends at an acute angle to the longitudinal central axis 142 of the valve sleeve 72. Therefore, the end surface 146 of the axially extending groove 100 slopes inwardly toward the axis 142 in a direction toward the axial end face 148 of the valve sleeve 71. It should be noted that the sloping end surface 146 of the groove 100 is disposed radially inwardly of the annular groove 114 in the outside of the valve sleeve 72. However, the sloping end surface 146 of the groove 100 intersects a cylindrical inside surface 152 of the valve sleeve 72 at a location which is spaced further from the end face 148 than an axially outermost and radially extending annular side surface 154 of the groove 114.

Since the sloping end surface 146 of the groove 100 is spaced from the axial end face 148 of the one-piece valve sleeve 72, a cylindrical sealing surface area 158 is provided between the end of the groove 100 and the axial end face 148 of the valve sleeve 72. The surface area 158 is part of the cylindrical inside surface 152 of the valve sleeve 72. The cylindrical surface area 158 sealingly engages a cylindrical outside surface 160 (see FIG. 1) of the valve member 48 to prevent fluid leakage between the axially extending grooves 100, 102, 104 and 106 and the axial end face 148 of the valve sleeve 72.

In order to form a constant depth main section 164 of the axially extending groove 100, the rotating end mill 128 is moved into the valve sleeve 72 along a path extending parallel to the longitudinal central axis 142 of the valve sleeve. As the end mill 128 moves from the position shown in FIG. 6 to the position shown in FIG. 7, the rotating circular end face 130 of the end mill 128 cuts away the material on the inside of the valve sleeve 72 to form the straight groove 100. Since the main body portion 164 of the groove 100 is formed by the rotating end face 130 of the end mill 128 as it moves from the position shown in FIG. 6 to the position shown in FIG. 7, the main section of the groove 100 has a generally semicircular cross-sectional configuration (see FIG. 8) in a plane extending perpendicular to the longitudinal central axis 142 (see FIG. 7) of the valve sleeve 72. This arcuate cross-sectional configuration promotes a quiet laminar flow of fluid during operation of the valve assembly.

In order to form the main section 164 of the groove with this semicircular configuration, the end mill 128 cuts the workpiece to a constant depth which is equal to the radial extent of the circular end face 130 of the end mill. It should be noted that if the end mill 128 should be moved inwardly to a slightly greater depth, the groove 100 would still be formed with the same circumferential width about the cylindrical surface 152. This is because the end face 130 of the end mill 128 is effective to form a groove having a width equal to the diameter of the end face 130 when the end mill is sunk into the material inside the sleeve (see FIG. 6) to a depth equal to the radial extend of the end face 130. This is particularly important since the groove 100 must cooperate with the inner valve member 48 in the manner shown in FIGS. 3 and 4 in order to control the flow of fluid to the power steering motor 26 in a predetermined manner.

The inward movement of the end mill 128 into the one-piece valve sleeve 72 is terminated at a sloping end surface 168. The end surface 168 is disposed radially inwardly of the annular groove 122. The sloping end surface 168 is formed by the circular end face 130 of the end mill 128 at a location axially inwardly of a second axial end surface 170 of the valve sleeve 72. The axial end surface 170 is formed on an annular shoulder and is disposed axially inwardly of an end face 174 formed at the end of the valve sleeve 72 opposite from the end face 148.

Figure 2:
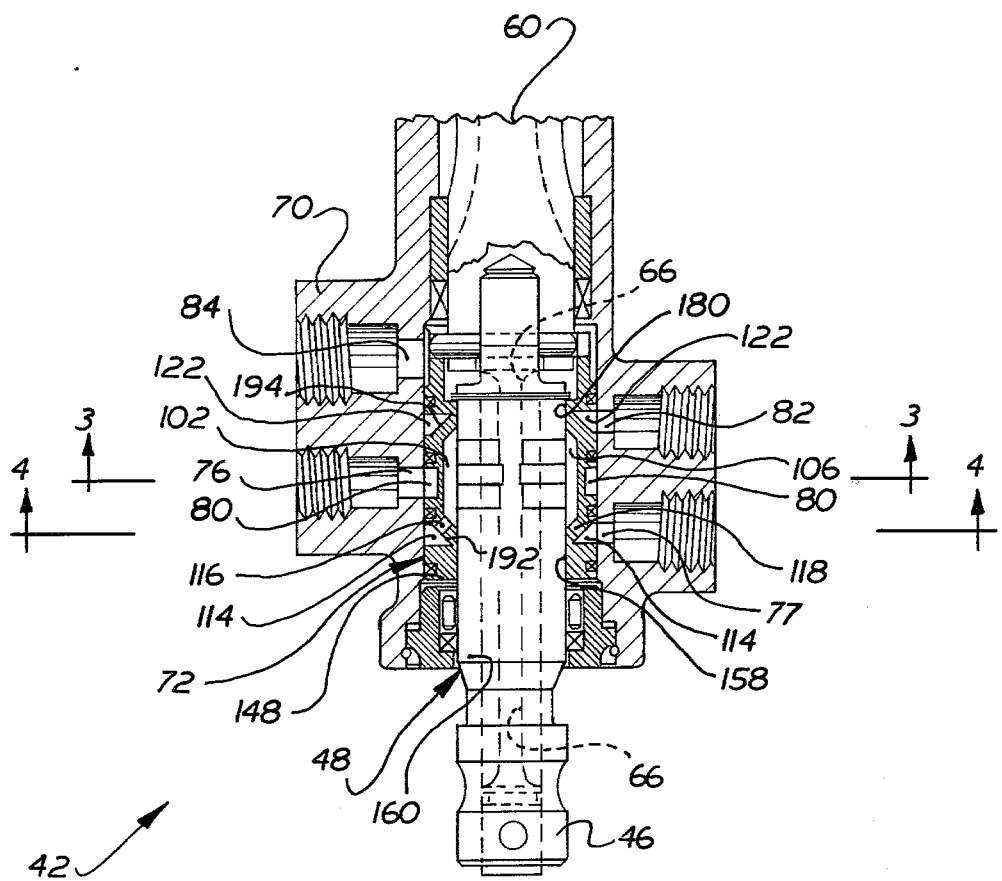
FIG. 2 is an enlarged fragmentary view further illustrating the construction of the valve assembly.

It should be noted that the portion 178 of the valve sleeve 72 between the shoulder surface 170 and end face 174 is utilized to engage a drive pin which rotates the valve sleeve 72 with the pinion gear 60 (see FIG. 2). Although the portion 178 of the valve sleeve does extend axially outwardly from the shoulder 170, the valving or fluid porting functions of the valve sleeve 72 are performed between the axial end surfaces 148 and 170 of the valve sleeve. By terminating the grooves 100, 102, 104, and 106 short of the annular shoulder surface 170, a second sealing surface area 180 is provided. This second surface area 180 sealingly engages the cylindrical outer surface of the inner valve member 64 in the manner illustrated in FIG. 2 to prevent axial leakage between the valve sleeve 72 and inner valve member 64.

Since the second end surface 168 of the axially extending groove 100 is formed by the circular end face 130 of the end mill 128 (FIG. 7) while the end surface 146 is formed by the cylindrical side portion 132 of the end mill (FIG. 6), the two end surfaces 146 and 168 have different configurations. The end surface 146 has a curved configuration forming part of a cylindrical plane having a size corresponding to the size of the side portion 132 of the end mill 128. It should be noted that the end surface 146 has a semicircular configuration at its radially outermost part, that is where the end surface 146 joins the longitudinally extending main body portion 164 of the groove 100.

The end surface 168 has a flat semicircular configuration corresponding to the configuration of the end face 130 of the end mill 128. Since the end mill 128 is rotated about a longitudinally extending central axis 134 (see FIG. 7) which extends at an acute angle of less than 45° relative to the central axis 142 of the valve sleeve, the slope of the end surface 168 is different from the slope of the surface 146. Thus, the end surface 146 has a slope relative to the central axis 142 of the valve sleeve which is the same as the slope of the axis 134 about which the end mill 128 is rotated.

The opposite axial end surface 168 is disposed in a plane which extends perpendicular to a plane containing the end surface 146 and extends at an acute angle which is complimentary to the acute angle at which the end surface 146 extends relative to the axis 142. It should be noted that the sloping end surface 168 is disposed radially inwardly of the annular groove 122 and terminates at a location which is axially inwardly of the radially extending annular side surface 188 of the annular groove 122. Thus, the groove 100 has an axial length which is less than the axial length of the array of annular grooves 80, 114, and 122 on the outside of the valve sleeve 72.

Figure 7:
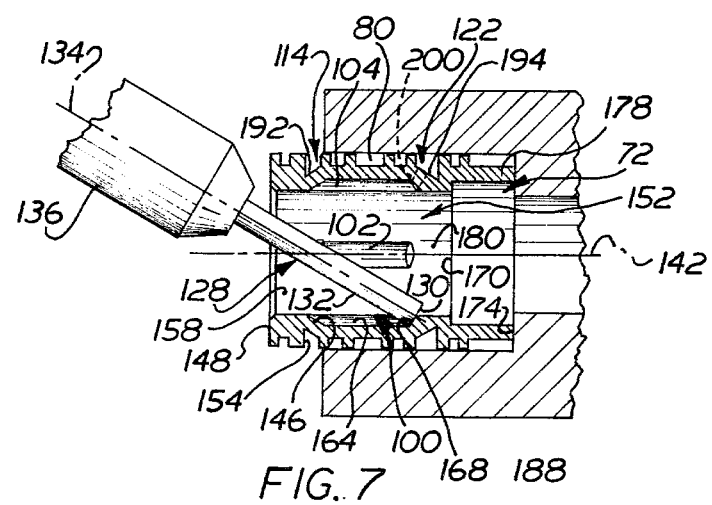
FIG. 7 is a fragmentary sectional view, generally similar to FIGS. 5 and 6, illustrating the relationship between the valve sleeve and the cutting tool after the cutting tool has been moved along the inside of the valve sleeve for a distance sufficient to form an axially extending groove.
Figure 8:
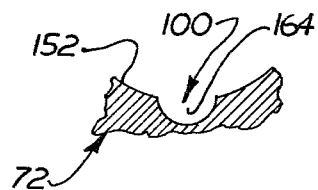
FIG. 8 is a fragmentary sectional view, taken along a plane extending perpendicular to a longitudinal central axis of the valve sleeve, illustrating the cross sectional configuration of a groove formed in the valve sleeve by utilizing a cutting tool in the manner shown in FIGS. 5 through 7.

Once the end mill 128 has been moved into the valve sleeve 122 for a distance sufficient to form the axially extending groove 100, that is to the position illustrated in FIG. 7, the rotating end mill is withdrawn from the valve sleeve 72. This is accomplished by moving the end mill 128 through a very short distance upwardly (as viewed in FIG. 7) and then moving it back along the same path as which it moved into the sleeve 72.

The end mill 128 is moved into and out of the valve sleeve 72 along a straight path which extends parallel to the longitudinal central axis 142 of the valve sleeve 72 while the valve sleeve is held stationary in the work holder or chuck 140. The end mill 128 is advanced into the workpiece along a path which extends perpendicular to the longitudinal central axis 142 of the sleeve 72, that is as the end mill is moved from the position shown in FIG. 5 to the position shown in FIG. 6.

The compact construction of the valve spool 72 is promoted by the fact that the equal length axially extending grooves 100, 102, 104, and 106 are terminated at a location which is radially inwardly from the two axially outermost annular grooves 114 and 122. Thus, each of the identical axially extending grooves 100, 102, 104, and 106 has a length which is less than the axial length of the array of annular grooves 80, 114, and 122 on the valve sleeve 72. This results in the sloping end surfaces of the axially extending grooves 100, 102, 104, and 106 enabling the annular grooves 114 and 122 to be relatively deep and to have axially sloping annular bottom surfaces 192 and 194 (FIG. 7).

The sloping bottom surface 192 of the groove 114 (see FIG. 12) forms a part of a cone. This cone has an angle at its peak equal to the acute angle between the axis of rotation 134 of the milling cutter 128 and the central axis 142 of the valve sleeve 72. By providing the annular outer surface 192 of the groove 114 with a slope which is the same as the slope of the end face 146, the axially outer groove 114 can be cut to a deeper radial depth than the central groove 80 (see FIG. 12).

In order to equalize the fluid flow capacities of the annular grooves 114 and 80, they have the same cross-sectional area (in a radial plane through the valve sleeve 72). Since the annular outer groove 114 in the valve sleeve 72 is cut deeper into the valve sleeve than the groove 80, the annular outer groove 114 has a smaller axial width or extent than the groove 80. By providing the groove 114 with a smaller axial extent than the groove 80, the axial extent of the valve sleeve 72 tends to be reduced to promote compact construction of the valve assembly 42.

Figure 12:
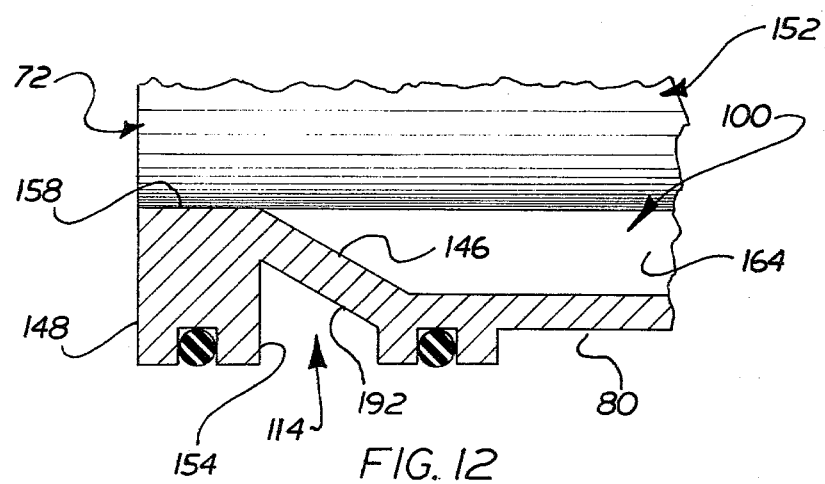
FIG. 12 is an enlarged fragmentary sectional view of a portion of the valve sleeve of FIG. 2.

Although only the annular groove 114 is shown in FIG. 12, it should be understood that the annular groove 122 at the axially opposite end of the array of annular grooves on the outside of the valve sleeve 72, is also cut deeper than the center groove 80 (see FIGS. 5-7). The annular groove 122 can be cut deeper than the center groove 78 since the axially extending inner grooves have sloping end surfaces 168 (FIG. 7). Although the end surfaces 168 of the grooves 100, 102, 104, and 106 slope at a different angle than the end surfaces 146, the annular grooves 122 and 114 have the same cross-sectional configuration and area. The annular sloping bottom surfaces 192 and 194 of the grooves 114 and 122 extend at the same angle relative to the central axis 142 of the valve sleeve. However, since the slope of the end surfaces 168 of the axially extending grooves 100, 102, 104, and 106 are different than the slope of the end surfaces 146, the thickness of the wall in a diametral plane extending through the centers of the grooves 100 and 104 are different (see FIG. 5).

Although the manner in which only the groove 100 is formed has been extensively described, it should be understood that the axially extending grooves 102, 104, and 106 are formed in the same manner as the axially extending groove 100. Of course, the work holder 140 is indexed through 90° to align the valve sleeve 72 for the sequential formation of the grooves 102, 104, and 106.

Once the grooves 100, 102, 104, and 106 have been formed inside the valve sleeve 72, the passages 116 and 118 (see FIG. 2) are drilled in the valve sleeve. These passages have central axes which extend perpendicular to the annular bottom surface 192 of the annular groove 114. Since the slope of the annular bottom surface 192 of the groove 114 is the same as the slope of the end surfaces of the grooves 102 and 106, the central axis of the holes 116 and 118 extend perpendicular to the end surfaces 146 of the grooves 102 and 106. Thus, the central axes of the cylindrical passages 116 and 118 extend at an acute angle to the longitudinal central axis 142 of the valve sleeve 72 and slope inwardly away from the axially outermost end face 148 of the valve sleeve 72.

Although only the passages 116 and 118 for the grooves 102 and 106 have been illustrated in FIG. 2, it should be understood that similar passages are provided in association with the grooves 100 and 104. However, the passages associated with the grooves 100 and 104 extend between the annular outer groove 122 and the ends of the axially extending grooves 100 and 104 at the opposite axial end of the valve sleeve. Thus, a passage 200 is drilled between the annular bottom surface 194 of the groove 122 and the end of the axially extending passage 104 in the manner shown in dashed lines in FIG. 7. A similar passage is provided between the bottom of the groove 122 and the axially extending groove 100.

In the illustrated embodiment of the valve sleeve 72, the projecting section 178 of the valve sleeve makes it advantageous to insert the rotating end mill 128 from the opposite axial end portion of the valve sleeve in the manner illustrated in FIG. 5. However, it is contemplated that the construction of the valve sleeve 72 could be revised somewhat to eliminate a major portion of the cylindrical projection 178. The rotating end mill 128 could then be inserted from the opposite axial end of the valve sleeve. This would enable the sloping end surfaces 168 of the grooves 100 and 104 to have the same spatial relationship with the annular groove 122 as the sloping end face 146 of the axially extending groove 100 has with the annular groove 114.

The annular grooves 80, 114, and 122 have been shown in the drawings as having been formed before the axially extending grooves 100, 102, 104, and 106 are formed. It is contemplated that it may be desirable to form the axial grooves and to then form the annular grooves. It should also be understood that the number and shape of both the annular and axial grooves could be varied if desired.

The axially extending grooves 100, 102, 104, and 106 have been described herein as being formed by moving the cutting tool 128 relative to the sleeve 72. It is contemplated that the grooves 100, 102, 104, and 106 could be formed by moving the valve sleeve 72 relative to the rotating cutting tool 128. In fact machine design considerations may make moving the rotating cutting tool 128 into engagement with the valve sleeve 72 (FIG. 6) and then moving the valve sleeve 72 axially relative to the cutting tool the preferred method of effecting relative movement between the rotating cutting tool and valve sleeve.

Other Methods Of Forming The Valve Sleeve

In the embodiment of the invention illustrated in FIGS. 5 through 7, the identical grooves 100, 102, 104, and 106 are formed in the valve sleeve 72 by cutting away metal mostly with the circular end face 130 at the rotating end mill 128. However, it is contemplated that it may be desirable to utilize the side portion 132 of the rotating end mill to cut away the material. Accordingly, the manner in which this would be accomplished has been illustrated in FIGS. 9 and 10. Since the method depicted in FIGS. 9 and 10 is generally similar to the method depicted in FIGS. 5 through 7, similar numerals will be utilized to designate similar components, the suffix letter "a" to be utilized in association with the numerals of FIGS. 9 and 10 in order to avoid confusion.

Figure 9:
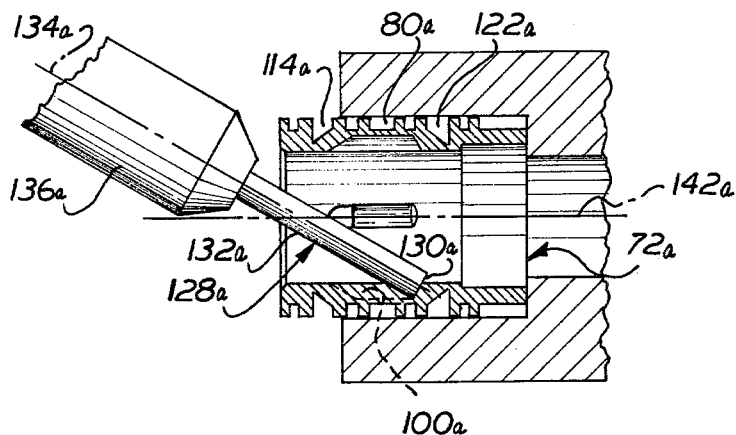
FIG. 9 is a fragmentary sectional view, generally similar to FIG. 6, illustrating the manner in which the leading end portion of the cutting tool engages the valve sleeve when a groove is to be formed in the valve sleeve by cutting away metal with a side portion of the cutting tool.
Figure 10:
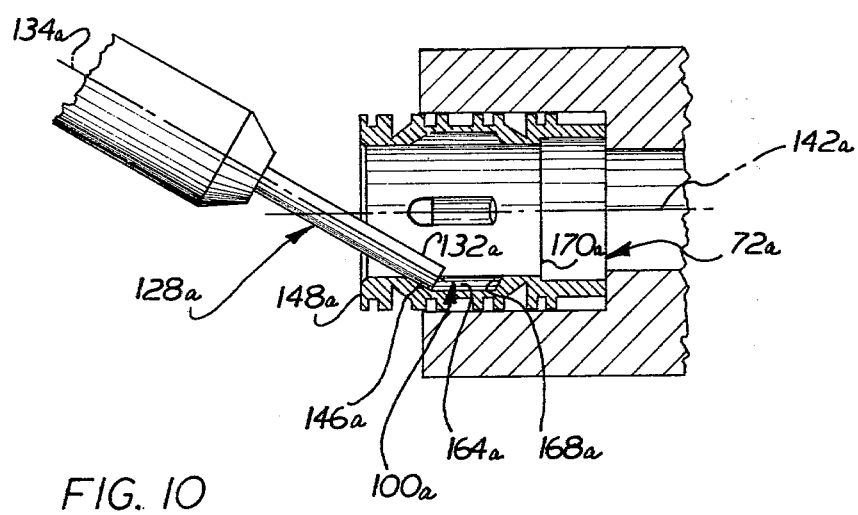
FIG. 10 is a fragmentary sectional view, generally similar to FIG. 7, illustrating the relationship between the cutting tool and valve sleeve after the cutting tool has been moved along the inside of the valve sleeve for a distance sufficient to enable the axially extending groove to be formed by the side portion of the cutting tool.

When the cylindrical side portion 132a of an end mill 128a is to be utilized to cut away material from inside of the valve sleeve 72a, the rotating end mill is fully inserted into the sleeve 72a before it is moved downwardly to engage the outer end portion of the cutting tool with the interior of the sleeve (see FIG. 9). The rotating end mill 128a is then withdrawn from the sleeve 72a along a straight path extending parallel to the longitudinal central axis 142a of the valve sleeve. The outward movement of the end mill 128a is interrupted when it reaches the opposite axial end of the groove 100 (see FIG. 10). During this outward movement, the side 132a of the outer end portion of the cutting tool 128a removes metal from the inside of the sleeve 72a.

The rotating end mill 128a is then moved straight upwardly (as viewed in FIG. 10) in a direction perpendicular to the longitudinal central axis 142a of the valve sleeve to disengage the rotating end mill 128a from the valve sleeve. The outward movement of the end mill 128a is then continued to completely separate the end mill from the valve sleeve 72a.

Since removing the material from the inside of the valve sleeve with the side portion 132a of the end mill 128a subjects the end mill to sidewise loading forces which may not be desirable, it is contemplated that the grooves could be formed in the valve sleeve by a combination of the methods shown in FIGS. 5-7 and 9-10. Thus, it is contemplated that the circular end face 130 of the end mill 128 could be utilized to form the groove to an initial depth, for example a depth equal to the radial extent of the end face 130. The side portion 132 of the end mill 128 would then be utilized to deepen the groove.

When this is done to form a groove similar to the groove 100, the leading end portion of the end mill 128 is inserted into the valve sleeve through a relatively short distance (see FIG. 5). The rotating end mill 128 is then moved to the position shown in FIG. 6 to engage the sleeve and begin the formation of the axially outer end surface of the groove. The rotating end mill 128 is then moved into the sleeve to form the groove 100 to a first depth (FIG. 7). The end mill 128 is then moved downwardly (as viewed in FIG. 7). After the end mill 128 has been pressed further into the sidewall of the valve sleeve 72, the end mill is moved back from the position shown in FIG. 7 to the position shown in FIG. 10 to cut away metal with the side portion 132 of the end mill.

Figure 11:
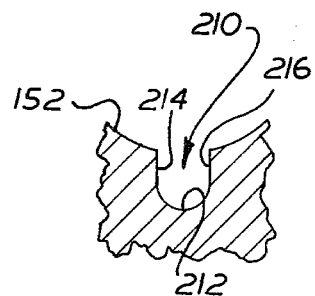
FIG. 11 is a fragmentary sectional view, generally similar to FIG. 8, illustrating the cross sectional configuration of an axially extending groove which was cut deeper into the valve sleeve than the groove of FIG. 8.

When an axially extending groove is formed by using both the circular end face 130 and the side portion 132 to cut away material on two successive strokes of the end mill 128, a relatively deep groove 210 (see FIG. 11) is formed. The groove 210 has a semicircular bottom surface are 212 of the same configuration as the groove 100 of FIG. 8. However, the groove 210 also has a pair of parallel side surfaces 214 and 216 which extend away from the semicircular surface area 212 and intersect the cylindrial side surface 152 of the valve sleeve 72.

Although the groove 210 is deepened by cutting away material with the side portion 132 of the end mill during a return stroke of the end mill, the width of the groove remains constant as the groove is deepened. This is because the groove was initially cut to a depth corresponding to the radial extent of the end face 130 of the mill 128 and then the mill was merely pressed deeper into the metal. Therefore, the side surfaces 214 and 216 of the groove 210 are spaced apart by a distance which is the same as the diameter of the end mill 128.

Summary

In view of the foregoing description, it can be seen that the present invention provides a new and improved valve sleeve 72 and a method of forming the valve sleeve. The hollow cylindrical valve sleeve 72 has a plurality of identical axially extending internal grooves 100, 102, 104, and 106 which are advantageously formed with a rotating cutting tool such as the end mill 128. While the end mill is rotating about an axis 134 which extends at an acute angle to the longitudinal central axis 142 of the valve sleeve 72, a leading end portion of the end mill engages the valve sleeve at a location which is spaced apart from axially opposite end portions of the valve sleeve (see FIGS. 6 and 9). This results in the formation of one end portion of an axially extending groove, such as the groove 100, within the valve sleeve 72.

The rotating cutting tool 128 is then moved along the inside of the valve sleeve to a location which is adjacent to and spaced apart from the opposite axial end of the valve sleeve 72 to thereby form the opposite axial end of the groove (see FIGS. 7 and 10). After the rotating cutting tool 128 has been removed from the sleeve, the sleeve is indexed and additional grooves are formed in the same manner as the groove 100. Each of the axially extending grooves 100, 102, 104, and 106 is disposed radially inwardly of and is shorter than an array of annular grooves 80, 114, and 122 on the outside of the valve sleeve 72.

Each of the grooves 100, 102, 104, and 106 has a pair of axially opposite sloping end surfaces. The sloping end surfaces of the grooves are connected with the axially outer annular grooves 114 and 122 in the outside of the valve sleeve 72 by passages similar to the passage 116, 118 and 200. These passages extend at an acute angled to the longitudinal central axis 142 of the valve sleeve 72. Since the passages extend at an acute angle relative to the central axis of the valve sleeve and since the passage interconnect the sloping end surfaces of the axially extending internal grooves with the annular external grooves 114 and 122, the length of the internal grooves 100, 102, 104, and 106 is minimized. This enables the valve assembly 42 to have a relatively compact construction. The compact construction of the valve sleeve 72 is further promoted by having the annular external grooves 114 and 122 shaped so as to have a depth which takes advantage of the sloping end surfaces of the internal grooves 100, 102, 104, and 106 and to enable the width of the annular external grooves 114 and 122 to be minimized.

During the formation of the grooves 100, 102, 104, and 106 on the inside of the valve sleeve 72, metal is cut away by either a leading end face 130 of a side portion 132 of the rotating cutting tool 128. When the leading end face 130 of the cutting tool is to be utilized to remove the metal, the rotating cutting tool 128 is moved into engagement with the inside of the valve sleeve at a location adjacent to one axial end of the valve sleeve (see FIG. 6). The rotating cutting tool 128 is moved into the valve sleeve in a direction toward the opposite axial end of the valve sleeve (see FIG. 7).

When the side portion 132 of the rotating cutting tool 128 is to be utilized to cut away material from the inside of the valve sleeve 72, the cutting tool is withdrawn from the valve sleeve as it is moved toward the axial end face 148 of the valve sleeve which is closest to the tool 136 which rotates the end mill 128 (see FIGS. 9 and 10). By utilizing a rotating cutting tool to form the axially extending grooves in the valve sleeve 72, the width of the grooves 100, 102, 104, and 106 can be accurately controlled. This is because the rotating cutting tool 128 has a predetermined diameter which, once the tool has entered the metal to a distance equal to the radius of the cutting tool causes the width of the groove to remain constant as the tool is pressed further into the metal even though the depth of the groove is increased (see FIGS. 8 and 11).

It should be noted that the axially extending grooves 100, 102, 104, and 106 could be formed by moving the valve sleeve 72 relative to the rotating cutting tool 128. Thus, the leading or outer end portion cutting tool could be moved into engagement with the stationary valve sleeve as shown in FIGS. 6 and 9. The valve sleeve could then be moved axially relative to the cutting tool. During the axial movement of the valve sleeve, the outer end portion of the cutting tool would remove metal to form a groove while the axis of rotation of the cutting tool remains stationary.

Having described specific preferred embodiments of the invention, the following is claimed:

1. A power steering apparatus comprising hydraulic motor means for assisting in operation of a vehicle steering gear, a housing having a plurality of passages connected in communication with a source of fluid and said hydraulic motor means, and valve means disposed in said housing for use in controlling fluid flow through said passages to thereby control operation of said hydraulic motor means, said valve means including an inner valve member and a one-piece cylindrical valve sleeve circumscribing said inner valve member, said valve sleeve including outer side surface means for defining an array of annular grooves each of which opens radially outwardly and extends around said sleeve, said array of annular grooves including a first annular groove connected in fluid communication with a first one of said passages in said housing, a second annular groove disposed to one axial side of said first annular groove and connected in fluid communication with a second one of said passages in said housing, said second annular groove having a radial depth which is greater than the radial depth of said first annular groove, said second annular groove having an annular bottom surface which slopes radially inwardly and axially in a direction away from said first annular groove so as to include a relatively large diameter surface portion and a relatively small diameter surface portion which small diameter portion is spaced further from said first annular groove than said relatively large diameter portion, and a third annular groove disposed to another axial side of said first groove opposite from said one axial side and connected in fluid communication with a third one of said passages in said housing, said third annular groove having a radial depth which is greater than the radial depth of said first annular groove, said valve sleeve further including inner surface means for defining a plurality of axially extending grooves on the inside of said valve sleeve and circumscribed by said array of annular grooves, each of said axially extending grooves having an axial length which is less than and within the axial extent of the array of annular grooves in the outside of said valve sleeve, at least one of said plurality of axially extending grooves having a first sloping end surface which is disposed adjacent to said second annular groove and extends at an acute angle to the longitudinal central axis of said valve sleeve and a first constant depth main section which extends axially away from said first sloping end surface and is at least partially disposed radially inwardly of said first annular groove, said first sloping end surface of said one of said plurality of axially extending grooves sloping radially inwardly and axially outwardly in a direction away from said first annular groove from a portion having a relatively large cross sectional area which is disposed adjacent to said relatively large diameter portion of said bottom surface of said second annular groove to a portion having a relatively small cross sectional area which is disposed adjacent to said relatively small diameter portion of said bottom surface of said second annular groove, at least another one of said plurality of axially extending grooves having a second sloping end surface which is disposed adjacent to said third annular groove and extends at an acute angle to the longitudinal central axis of said valve sleeve and a second constant depth main section which extends axially away from said second sloping end surface and is at least partially disposed radially inwardly of said first annular groove and passage means for connecting each of said plurality of axially extending grooves in fluid communication with one of the grooves of said array of annular grooves.

2. An apparatus as set forth in claim 1 wherein said passage means includes a first valve passage means for conducting fluid between said second annular groove and said one axially extending groove, said first valve passage means having a central axis which extends at an acute angle to the longitudinal central axis of said valve sleeve, said first valve passage means having a first opening formed in the bottom surface of said said second annular groove and a second opening formed in said first sloping end surface of said one axially extending groove.

3. An apparatus as set forth in claim 1 wherein said third annular groove has an annular bottom surface which slopes radially inwardly and axially in a direction away from said first annular groove so as to include a relatively large diameter surface portion and a relatively small diameter surface portion which is spaced further from said second annular groove than said relatively large diameter portion.

4. An apparatus as set forth in claim 3 wherein said second sloping end surface of said other one of said plurality of axially extending grooves slopes radially inwardly and axially in a direction away from said first annular groove so as to include a portion having a relatively large cross sectional area which is disposed adjacent to said relatively large diameter portion of said bottom surface of said third annular groove and a portion having a relatively small cross sectional area which is disposed adjacent to said relatively small diameter surface portion of said bottom surface of said third annular groove.

5. An apparatus as set forth in claim 2 wherein said passage means includes second valve passage means for conducting fluid between said third annular groove and said other axially extending groove, said second valve passage means having a central axis which extends at an acute angle to the longitudinal central axis of said valve sleeve, said second valve passage means having a first opening formed in the bottom surface of said third annular groove and a second opening formed in said second sloping end surface of said other axially extending groove.

6. An apparatus as set forth in claim 2 wherein said second annular groove has a tapered bottom surface which extends substantially at the same acute angle relative to the central axis of said sleeve as does said first sloping end surface.

7. An apparatus as set forth in claim 1 wherein said first sloping end surface is at least partially disposed radially inwardly of said second annular groove and said second sloping end surface is at least partially disposed radially inwardly of said third annular groove.

8. An apparatus as set forth in claim 1 wherein said first annular groove has an axial width which is greater than the axial width of said second and third annular grooves.

* * * * *

UNITED STATES PATENT AND TRADEMARK OFFICE
CERTIFICATE OF CORRECTION

PATENT NO. : 4,276,812

DATED : July 7, 1981

INVENTOR(S) : Richard Warren Dymond

It is certified that error appears in the above-identified patent and that said Letters Patent are hereby corrected as shown below:

Column 13, line 45, delete "said" (second occurrence).

Signed and Sealed this

Twentieth Day of October 1981

[SEAL]

Attest:

GERALD J. MOSSINGHOFF

Attesting Officer     Commissioner of Patents and Trademarks